US010174986B2

(12) United States Patent
Yokoyama et al.

(10) Patent No.: US 10,174,986 B2
(45) Date of Patent: Jan. 8, 2019

(54) HEAT SOURCE MACHINE AND CONTROL METHOD THEREFOR

(71) Applicant: MITSUBISHI HEAVY INDUSTRIES THERMAL SYSTEMS, LTD., Tokyo (JP)

(72) Inventors: Akimasa Yokoyama, Tokyo (JP); Kenji Ueda, Tokyo (JP); Yasushi Hasegawa, Tokyo (JP); Noriyuki Matsukura, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 190 days.

(21) Appl. No.: 15/024,616

(22) PCT Filed: Nov. 5, 2014

(86) PCT No.: PCT/JP2014/079324
§ 371 (c)(1),
(2) Date: Mar. 24, 2016

(87) PCT Pub. No.: WO2015/072376
PCT Pub. Date: May 21, 2015

(65) Prior Publication Data
US 2016/0216024 A1    Jul. 28, 2016

(30) Foreign Application Priority Data

Nov. 13, 2013 (JP) .................................. 2013-235264

(51) Int. Cl.
*F25D 17/02* (2006.01)
*F25B 25/00* (2006.01)
(Continued)

(52) U.S. Cl.
CPC .............. *F25D 17/02* (2013.01); *F24F 11/83* (2018.01); *F25B 25/005* (2013.01); *F25B 49/02* (2013.01);
(Continued)

(58) Field of Classification Search
CPC ............ F25B 2500/19; F25B 2700/197; F25B 2700/21161; F25B 2700/21173; F25D 17/02
(Continued)

(56) References Cited

U.S. PATENT DOCUMENTS 6,145,751 A * 11/2000 Ahmed .................. F24F 11/006
165/208
6,276,152 B1 * 8/2001 Sibik ...................... F25B 49/02
62/179
(Continued)

FOREIGN PATENT DOCUMENTS

JP    63-129250 A    6/1988
JP    3-236580 A    10/1991
(Continued)

OTHER PUBLICATIONS

Chinese Office Action and Search Report, dated Feb. 4, 2017, for Chinese Application No. 201480053030.7, with an English translation.
(Continued)

*Primary Examiner* — Henry Crenshaw
(74) *Attorney, Agent, or Firm* — Birch, Stewart, Kolash & Birch, LLP (57) ABSTRACT

The present invention has an object to suppress an overshoot in the outlet temperature of a heat medium. A heat source machine controlling apparatus includes a computing unit and a set temperature changing unit. The computing unit calculates a load change rate using a predetermined arith-
(Continued)

metic expression. The set temperature changing unit determines whether or not the load change rate calculated by the computing unit exceeds a predetermined threshold value. In the case where the load change rate exceeds the predetermined threshold value, the set temperature changing unit changes a set chilled water outlet temperature so as to suppress a change in a chilled water outlet temperature. For example, in the case where the chilled water outlet temperature is on a falling trend, if the set chilled water outlet temperature is set to a relatively high value, the heat source machine load decreases, and the chilled water outlet temperature is controlled to coincide with the set chilled water outlet temperature after the change. Consequently, an overshoot can be suppressed.

4 Claims, 5 Drawing Sheets (51) Int. Cl.
F25D 29/00 (2006.01)
F25B 49/02 (2006.01)
F24F 11/83 (2018.01)
F25B 1/053 (2006.01)

(52) U.S. Cl.
CPC .............. F25D 29/00 (2013.01); F25B 1/053 (2013.01); F25B 2339/047 (2013.01); F25B 2341/0662 (2013.01); F25B 2400/13 (2013.01); F25B 2500/19 (2013.01); F25B 2600/021 (2013.01); F25B 2600/0261 (2013.01); F25B 2600/0272 (2013.01); F25B 2700/195 (2013.01); F25B 2700/197 (2013.01); F25B 2700/21161 (2013.01); F25B 2700/21163 (2013.01); F25B 2700/21172 (2013.01); F25B 2700/21173 (2013.01); Y02B 30/741 (2013.01)

(58) Field of Classification Search
USPC .......................................................... 62/177
See application file for complete search history.

(56) References Cited

U.S. PATENT DOCUMENTS

| | | | |
|---|---|---|---|
| 6,508,068 B2* | 1/2003 | Ohkawara | F25D 17/02 165/45 |
| 6,688,124 B1 | 2/2004 | Stark et al. | |
| 7,637,315 B2* | 12/2009 | Ichinose | G05D 23/192 165/243 |
| 2001/0037652 A1* | 11/2001 | Sasayama | F25D 17/02 62/201 |
| 2003/0192325 A1* | 10/2003 | Cocchi | A23G 9/22 62/66 |
| 2006/0086114 A1* | 4/2006 | Nishiyama | F25B 21/02 62/185 |
| 2008/0006044 A1* | 1/2008 | Tan | F25B 41/04 62/197 |
| 2013/0125573 A1 | 5/2013 | Nikaido et al. | |
| 2014/0358253 A1 | 12/2014 | Tateishi et al. | |
| 2015/0056059 A1 | 2/2015 | Crane | |

FOREIGN PATENT DOCUMENTS

| | | |
|---|---|---|
| JP | 10-089783 A | 4/1998 |
| JP | 2000-345790 A | 12/2000 |
| JP | 2002-061925 A | 2/2002 |
| JP | 2005-016872 A | 1/2005 |
| JP | 2007-046857 A | 2/2007 |
| JP | 2007-147094 A | 6/2007 |
| JP | 2008-002765 A | 1/2008 |
| JP | 2013-160440 A | 8/2013 |
| JP | 2013-164223 A | 8/2013 |
| WO | WO 2013/129464 A1 | 9/2013 |
| WO | WO 2013/165841 A1 | 11/2013 |

OTHER PUBLICATIONS

Extended European Search Report, dated Feb. 3, 2017, for European Application No. 14863022.1.
Partial Supplementary European Search Report dated Oct. 5, 2016 for corresponding European Patent Application No. 14863022.1.
International Search Report (PCT/ISA/210) issued in PCT/JP2014/079324, dated Feb. 10, 2015.
Written Opinion (PCT/ISA/237) issued in PCT/JP2014/079324, dated Feb. 10, 2015.

* cited by examiner

HEAT SOURCE MACHINE AND CONTROL METHOD THEREFOR

TECHNICAL FIELD

The present invention relates to a heat source machine and a control method therefor.

BACKGROUND ART

A centrifugal chiller known up to now includes a refrigeration cycle in which a compressor, a condenser, and an evaporator are arranged. The centrifugal chiller cools chilled water input to the evaporator to a predetermined set temperature, and outputs the resultant chilled water (see, for example, PTL 1).

CITATION LIST

Patent Literature

[PTL 1]
Japanese Unexamined Patent Application, Publication No. 2013-160440

SUMMARY OF INVENTION

Technical Problem

In general, if the temperature or flow rate of chilled water (heat medium) input to a centrifugal chiller significantly fluctuates, control cannot follow this fluctuation, so that an overshoot may occur in the outlet temperature of the chilled water. The occurrence of the overshoot, which is not preferable in operations of the centrifugal chiller, needs to be suppressed. Such an overshoot occurs not only in the case of cooling the heat medium but also in the case of heating the heat medium.

In particular, the overshoot becomes problematic in the case of cooling the chilled water and where the set outlet temperature of the chilled water is set to around 0° C. That is, if the overshoot occurs in this case, the chilled water may be cooled to 0° C. or lower, and may be frozen in the worst case. Accordingly, in the case where the set outlet temperature of the chilled water is set to around 0° C., the chilled water cannot be used as the heat medium, and an antifreeze solution (brine) is conventionally used thereas. The antifreeze solution however has a lower heat exchange efficiency in a heat exchanger than that of the chilled water, and hence it is preferable to use the chilled water as the heat medium from the perspective of heat exchange.

In addition, a heat source machine that cools a heat medium and outputs the cooled heat medium to an external load, such as the centrifugal chiller, has the following problem. Under the conditions that the heat source machine load is high and that the outside temperature is high, the amount of exhaust heat of cooling water that exchanges heat with a refrigerant in a condenser is large, and hence the cooling water may not be decreased to a desired temperature. In this case, the refrigerant condensation pressure increases, and the heat source machine needs to be forcibly stopped in some cases, resulting in a decrease in operation efficiency.

The present invention, which has been made in view of the above-mentioned circumstances, has an object to provide a heat source machine and a control method therefor capable of suppressing an overshoot in the outlet temperature of a heat medium.

The present invention has another object to provide a heat source machine and a control method therefor capable of avoiding a forcible stop of the heat source machine even under the conditions that the heat source machine load is high and that the outside temperature is high.

Solution to Problem

A first aspect of the present invention provides a heat source machine including a heat pump cycle in which a compressor, a first heat exchanger, and a second heat exchanger are arranged, the heat source machine performing, in the second heat exchanger, heat exchange between a heat medium supplied from an external load and a refrigerant to thereby cool or heat the heat medium to a predetermined set outlet temperature and supply the cooled or heated heat medium to the external load, the heat source machine including: a computing unit configured to calculate an evaluation value on a fluctuation for at least any one parameter of an inlet temperature of the heat medium, a flow rate of the heat medium, an inlet temperature of a heat source supplied to the first heat exchanger, a flow rate of the heat source, and a heat source machine load rate, using an arithmetic expression held in advance; and a set temperature changing unit configured to change the set outlet temperature of the heat medium so as to suppress a change (fluctuation) in an outlet temperature of the heat medium, in a case where the evaluation value calculated by the computing unit exceeds a predetermined threshold value.

According to the heat source machine of the present aspect, in the case where the heat medium is cooled and outputted to the external load, the first heat exchanger functions as a condenser, and the second heat exchanger functions as an evaporator. In this case, an evaluation value on a fluctuation is calculated by the computing unit at least any one parameter of the inlet temperature of the heat medium, the flow rate of the heat medium, the inlet temperature of the heat source (cooling water) supplied to the first heat exchanger (condenser), the flow rate of the heat source, and the heat source machine load rate, using an arithmetic expression held in advance. In the case where the evaluation value exceeds a predetermined threshold value, a sign of an overshoot is detected, and the set outlet temperature of the heat medium is changed by the set temperature changing unit. At this time, the set outlet temperature of the heat medium is changed such that a change in the outlet temperature of the heat medium is suppressed, and hence an overshoot in the outlet temperature of the heat medium can be suppressed.

In the case where the heat medium is heated and outputted to the external load, the first heat exchanger functions as an evaporator, and the second heat exchanger functions as a condenser. In this case, an evaluation value on a fluctuation is calculated by the computing unit at least any one parameter of the inlet temperature of the heat medium, the flow rate of the heat medium, the inlet temperature of the heat source (for example, warm water) supplied to the first heat exchanger (evaporator), the flow rate of the heat source, and the heat source machine load rate, using a predetermined arithmetic expression. In the case where the evaluation value exceeds a threshold value, a sign of an overshoot is detected, and the set outlet temperature of the heat medium is changed by the set temperature changing unit. At this time, the set outlet temperature of the heat medium is changed such that a change in the outlet temperature of the heat medium is suppressed, and hence an overshoot in the outlet temperature of the heat medium can be suppressed.

In the above-mentioned heat source machine, the computing unit may calculate the evaluation value using a moving average.

The use of a moving average enables noise component removal and more accurate detection of a sign of an overshoot. Consequently, an unnecessary change in the set outlet temperature due to erroneous detection can be avoided.

In the above-mentioned heat source machine, an initial value of the set outlet temperature of the heat medium may be set to around 0° C. (for example, 0° C. or higher and 5° C. or lower).

According to the heat source machine of the present aspect, because an overshoot is suppressed as described above, even in the case where the initial value of the set outlet temperature of the heat medium is set to around 0° C., the outlet temperature of the heat medium can be suppressed from decreasing to 0° C. or lower. Consequently, chilled water can be used as the heat medium, and the heat exchange efficiency in the second heat exchanger can be enhanced compared with the case of using an antifreeze solution.

A second aspect of the present invention provides a heat source machine including a heat pump cycle in which a compressor, a condenser, and an evaporator are arranged, the heat source machine performing, in the evaporator, heat exchange between a heat medium supplied from an external load and a refrigerant to thereby cool the heat medium to a predetermined set outlet temperature and supply the cooled heat medium to the external load, the heat source machine including: an information acquiring unit configured to acquire a refrigerant condensation pressure or a refrigerant condensation temperature of the condenser; and a set temperature changing unit configured to increase the set outlet temperature of the heat medium in a case where the refrigerant condensation pressure or the refrigerant condensation temperature acquired by the information acquiring unit exceeds a predetermined threshold value.

According to the heat source machine of the present aspect, in the case where the refrigerant condensation pressure or the refrigerant condensation temperature of the condenser exceeds the predetermined threshold value, the set outlet temperature of the heat medium is changed so as to increase, and hence the heat source machine load can be decreased. Consequently, the refrigerant condensation pressure or the refrigerant condensation temperature can be decreased, and a forcible stop of the heat source machine caused when the refrigerant condensation pressure or the refrigerant condensation temperature exceeds the threshold value can be avoided. As a result, a decrease in the operation efficiency of the heat source machine can be suppressed.

A third aspect of the present invention provides a control method for a heat source machine including a heat pump cycle in which a compressor, a first heat exchanger, and a second heat exchanger are arranged, the heat source machine performing, in the second heat exchanger, heat exchange between a heat medium supplied from an external load and a refrigerant to thereby cool or heat the heat medium to a predetermined set outlet temperature and supply the cooled or heated heat medium to the external load, the control method including: a computing step of calculating an evaluation value on a fluctuation for at least any one parameter of an inlet temperature of the heat medium, a flow rate of the heat medium, an inlet temperature of a heat source supplied to the first heat exchanger, a flow rate of the heat source, and a heat source machine load rate, using an arithmetic expression held in advance; and a set temperature changing step of changing the set outlet temperature of the heat medium so as to suppress a change in an outlet temperature of the heat medium, in a case where the evaluation value calculated in the computing step exceeds a predetermined threshold value.

A fourth aspect of the present invention provides a control method for a heat source machine including a heat pump cycle in which a compressor, a condenser, and an evaporator are arranged, the heat source machine performing, in the evaporator, heat exchange between a heat medium supplied from an external load and a refrigerant to thereby cool the heat medium to a predetermined set outlet temperature and supply the cooled heat medium to the external load, the control method including: an information acquiring step of acquiring a refrigerant condensation pressure or a refrigerant condensation temperature of the condenser; and a set temperature changing step of increasing the set outlet temperature of the heat medium in a case where the refrigerant condensation pressure or the refrigerant condensation temperature acquired in the information acquiring step exceeds a predetermined threshold value.

Advantageous Effects of Invention

According to the present invention, an overshoot in the outlet temperature of the heat medium can be suppressed. Consequently, for example, even in the case where the set outlet temperature of the heat medium is set to around 0° C., water can be used as the heat medium, and the thermal efficiency in the heat exchanger can be enhanced.

According to the present invention, a forcible stop of the heat source machine can be avoided even under the conditions that the heat source machine load is high and that the outside temperature is high. Consequently, a stable heat source machine operation can be achieved.

DESCRIPTION OF EMBODIMENTS

First Embodiment

Figure 1:
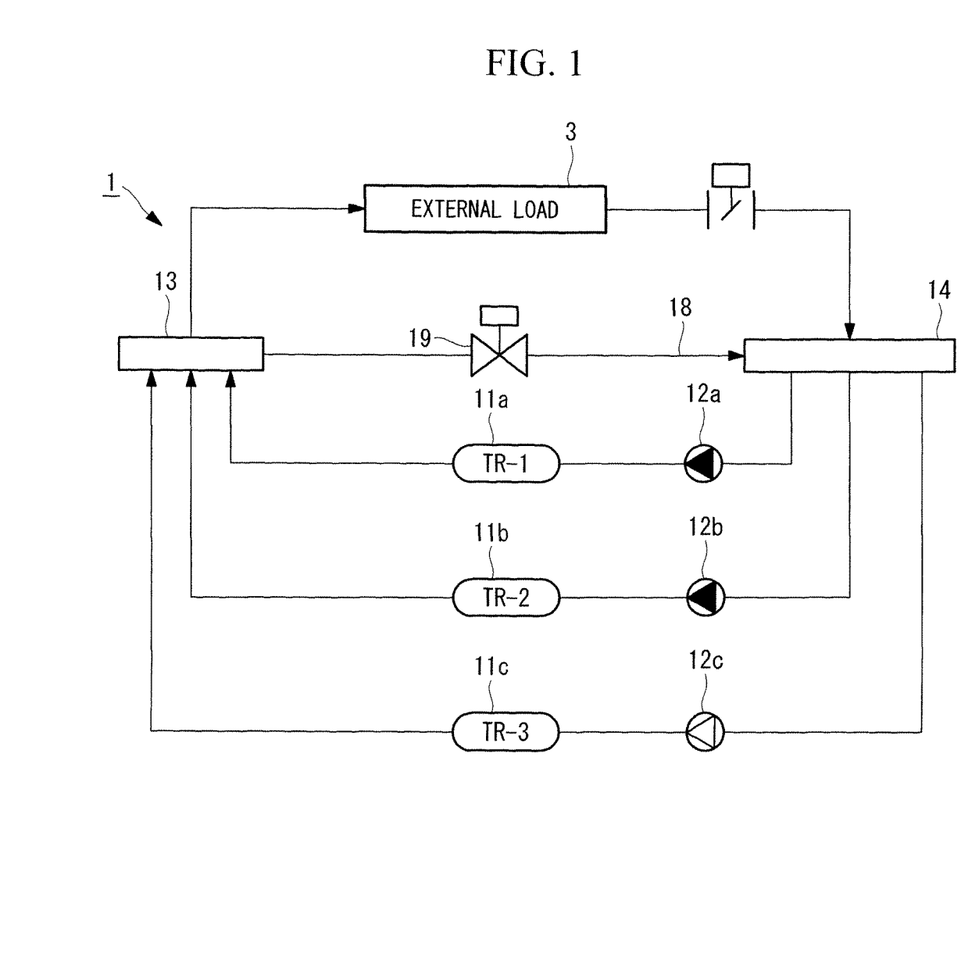
FIG. 1 is a diagram schematically illustrating a configuration of a heat source system to which a heat source machine according to a first embodiment of the present invention is applied.

Hereinafter, a heat source machine and a control method therefor according to the first embodiment of the present invention are described with reference to the drawings. FIG. 1 is a diagram schematically illustrating a configuration of a heat source system 1 to which the heat source machine according to the first embodiment of the present invention is applied.

The heat source system 1 includes a plurality of heat source machine 11a, 11b, and 11c. In the present embodiment, for convenience of description, description is given of the case where the heat source machine 11a, 11b, and 11c function as cooling apparatuses that cool chilled water (heat medium) to be supplied to an external load 3 such as air-conditioning equipment, hot-water supply equipment, or plant equipment, but the heat source machine 11a, 11b, and 11c of the present invention may function as, for example, heating apparatuses that heat chilled water (heat medium) and may have both the cooling and heating functions.

FIG. 1 illustrates an example case where the three heat source machine 11a, 11b, and 11c are installed, but the installation number of heat source machine can be determined as appropriate.

Chilled water pumps 12a, 12b, and 12c that feed chilled water under pressure are respectively installed upstream of the heat source machine 11a, 11b, and 11c in the chilled water flow. Chilled water from a return header 14 is sent to the heat source machine 11a, 11b, and 11c by the chilled water pumps 12a, 12b, and 12c. The chilled water pumps 12a, 12b, and 12c are each driven by an inverter motor (not illustrated), whereby the rotational speeds thereof are made variable to achieve variable flow rate control.

A supply header 13 collects chilled water chilled by the heat source machine 11a, 11b, and 11c. The chilled water collected by the supply header 13 is supplied to the external load 3. The chilled water used for air conditioning or other purposes and raised in temperature by the external load 3 is sent to the return header 14. The chilled water is branched and sent to the heat source machine 11a, 11b, and 11c by the return header 14.

A bypass pipe 18 is provided between the supply header 13 and the return header 14. The amount of chilled water to be supplied to the external load 3 can be adjusted by adjusting the degree of opening of a bypass valve 19 provided to the bypass pipe 18.

Figure 2:
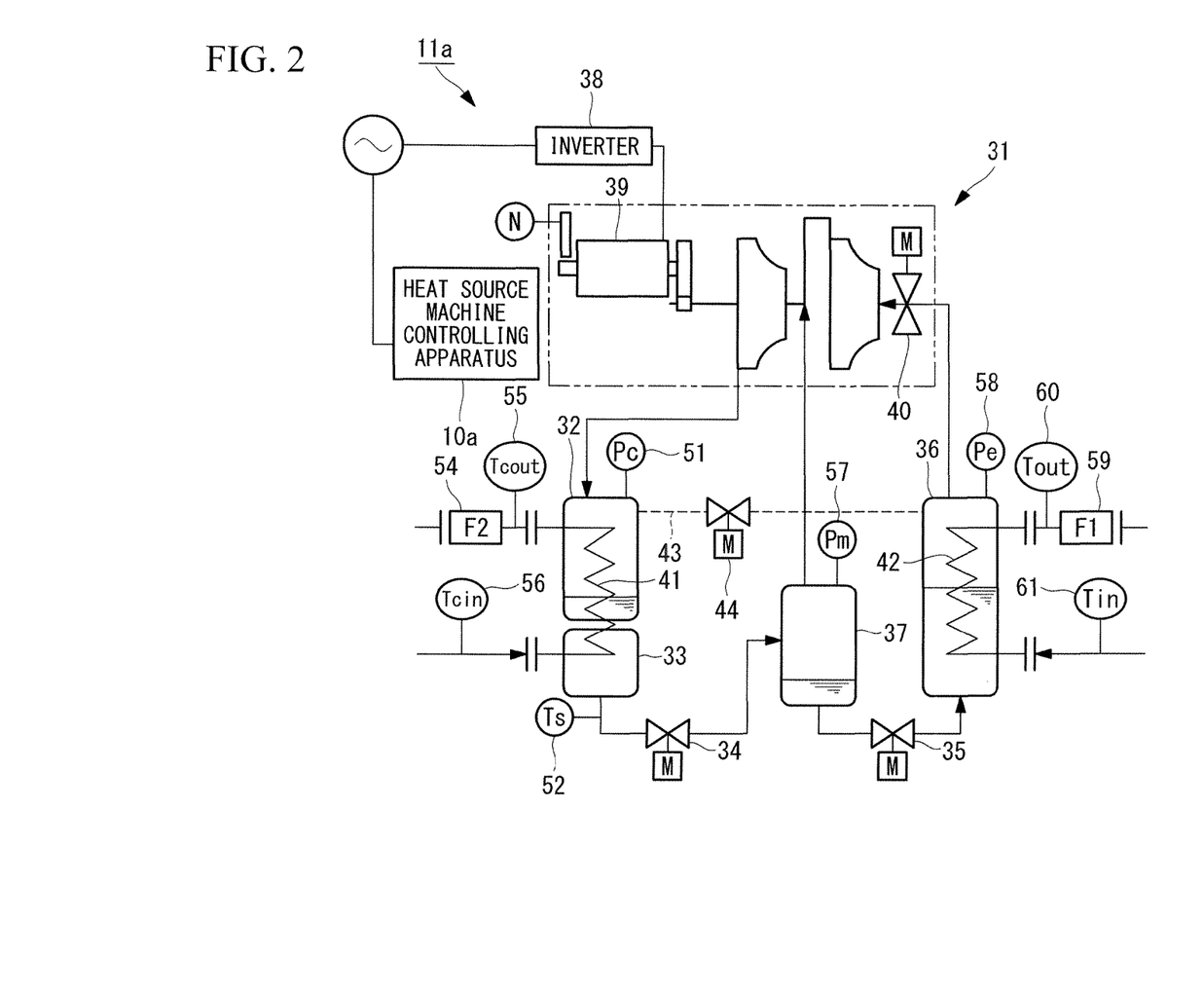
FIG. 2 is a diagram illustrating a schematic configuration of the heat source machine according to the first embodiment of the present invention.

FIG. 2 is a diagram illustrating a schematic configuration of each of the heat source machine 11a, 11b, and 11c. The configurations and functions of the heat source machine 11a, 11b, and 11c are the same, and hence the heat source machine 11a is taken as an example in the following description.

The heat source machine 11a is, for example, a centrifugal chiller, and mainly includes: a compressor 31 that compresses a refrigerant; a condenser 32 that condenses the high-temperature high-pressure gas refrigerant compressed by the compressor 31; and an evaporator 36 that evaporates the liquid refrigerant condensed by the condenser 32.

The compressor 31 is, for example, a centrifugal two-stage compressor, and is driven by an electric motor 39 whose rotational speed is controlled by an inverter 38. The output power of the inverter 38 is controlled by a heat source machine controlling apparatus 10a. Note that the compressor 31 may be a fixed-speed compressor having a fixed rotational speed. An inlet guide vane (hereinafter, referred to as the "IGV") 40 that controls an intake refrigerant flow rate is provided at a refrigerant intake port of the compressor 31, whereby the capacity of the heat source machine 11a can be controlled.

The condenser 32 is provided with a pressure sensor 51 for measuring a refrigerant condensation pressure Pc. The output of the pressure sensor 51 is transmitted to the heat source machine controlling apparatus 10a.

A sub-cooler 33 is provided on the refrigerant flow downstream side of the condenser 32 so as to supercool the condensed refrigerant. A temperature sensor 52 that measures a refrigerant temperature Ts after the supercooling is provided immediately on the refrigerant flow downstream side of the sub-cooler 33.

A cooling heat-transfer pipe 41 for cooling the condenser 32 and the sub-cooler 33 is inserted through the condenser 32 and the sub-cooler 33. A cooling water flow rate F2 is measured by a flowmeter 54, a cooling water outlet temperature Tcout is measured by a temperature sensor 55, and a cooling water inlet temperature Tcin is measured by a temperature sensor 56. The heat of cooling water is released to the outside in a cooling tower (not illustrated), and is then guided to the condenser 32 and the sub-cooler 33 again.

The liquid refrigerant from the sub-cooler 33 is expanded by a high pressure expansion valve 34, and is sent to an intercooler 37. The intercooler 37 is provided with a pressure sensor 57 for measuring an intermediate pressure Pm. The liquid refrigerant cooled by the intercooler 37 is expanded by a low pressure expansion valve 35, and is sent to the evaporator 36. The evaporator 36 is provided with a pressure sensor 58 for measuring an evaporation pressure Pe. A chilled water heat-transfer pipe 42 for cooling the chilled water to be supplied to the external load 3 (see FIG. 1) is inserted through the evaporator 36. A chilled water flow rate F1 is measured by a flowmeter 59, a chilled water outlet temperature Tout is measured by a temperature sensor 60, and a chilled water inlet temperature Tin is measured by a temperature sensor 61.

A hot gas bypass pipe 43 is provided between a gas phase portion of the condenser 32 and a gas phase portion of the evaporator 36. A hot gas bypass valve 44 for controlling the flow rate of the refrigerant flowing in the hot gas bypass pipe 43 is also provided. The capacity in an extremely small region that cannot be sufficiently controlled by the IGV 40 can be controlled by adjusting the hot gas bypass flow rate by means of the hot gas bypass valve 44.

In the heat source machine 11a illustrated in FIG. 2, the condenser 32 and the sub-cooler 33 are provided, and heat exchange is performed between the refrigerant and the cooling water whose heat is released to the outside in the cooling tower, whereby the cooling water is warmed. Alternatively, for example, an air heat exchanger may be arranged instead of the condenser 32 and the sub-cooler 33, and heat exchange may be performed between the outside air and the refrigerant in the air heat exchanger.

The heat source machine controlling apparatus 10a is, for example, a computer, and includes a central processing unit (CPU), a main memory such as a random access memory (RAM), an auxiliary memory, and a communication apparatus that communicates with external devices to transmit and receive information.

The auxiliary memory is a computer-readable recording medium, and examples thereof include a magnetic disk, a magneto optical disk, a CD-ROM, a DVD-ROM, and a semiconductor memory. Various programs are stored in the auxiliary memory, and the CPU reads out the programs from the auxiliary memory onto the main memory and executes the programs, to thereby achieve various processes.

Figure 3:
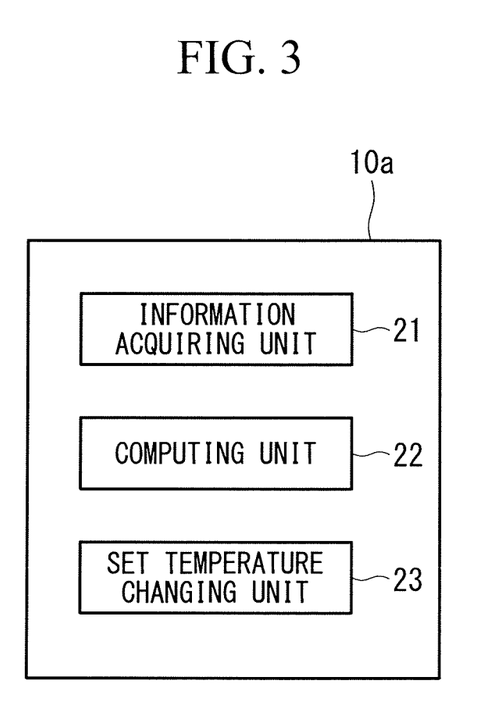
FIG. 3 is a diagram illustrating a functional block example of a heat source machine controlling apparatus illustrated in FIG. 2.

FIG. 3 is a diagram illustrating a functional block example of the heat source machine controlling apparatus 10a illustrated in FIG. 2. As illustrated in FIG. 3, the heat source machine controlling apparatus 10a includes a data acquiring unit 21, a computing unit 22, and a set temperature changing unit 23.

The data acquiring unit 21 acquires measurement values measured by various sensors, such as the refrigerant condensation pressure Pc, the refrigerant temperature Ts, the cooling water flow rate F2, the cooling water outlet temperature Tcout, the cooling water inlet temperature Tcin, the chilled water flow rate F1, the chilled water outlet temperature Tout, and the chilled water inlet temperature Tin.

The computing unit 22 calculates a load change rate (an evaluation value on a fluctuation) using the measurement values acquired by the data acquiring unit 21. The load change rate is calculated according to, for example, Expression (1) given below.

$$\text{Load Change Rate} = (A \times (Qe(i) - Qe(i-1)) + Qe(i-1))/Qe(i-1) \quad (1)$$

In Expression (1), A represents the current load rate, which is a value obtained by dividing the current refrigeration capacity by the rated refrigeration capacity, Qe(i) represents an average amount of heat exchange of the evaporator 36 in a past predetermined period from the present, and Qe(i−1) represents an average amount of heat exchange of the evaporator 36 in a past predetermined period from the previous sampling cycle. Here, the amount of heat exchange Qe of the evaporator 36 is obtained according to Expression (2) given below.

$$Qe(\text{kW}) = (Tin - Tout) \times F1 \times \rho \times c \quad (2)$$

Here, Tin represents the chilled water inlet temperature (° C.), Tout represents the chilled water outlet temperature (° C.), F1 represents the chilled water flow rate (m³/s), ρ represents the chilled water density (kg/m³), and c represents the specific heat (kJ/kg° C.).

The value can be smoothed using a moving average in this way. The past predetermined period can be set as appropriate depending on a design, and is preferably set to, for example, between 100 seconds and 140 seconds. In the present embodiment, the past predetermined period is set to 120 seconds.

The set temperature changing unit 23 changes a set chilled water outlet temperature by a predetermined amount in the case where the load change rate calculated by the computing unit 22 exceeds a predetermined threshold value. The predetermined amount is, for example, a temperature corresponding to approximately 10% of the difference between the chilled water inlet temperature and the set chilled water outlet temperature. For example, in the case where the chilled water inlet temperature is 12° C. and where the set chilled water outlet temperature is 7° C., the predetermined amount is 0.5° C.

In the case where the load change rate is positive, that is, where the chilled water outlet temperature is on a rising trend, the set temperature changing unit 23 decreases the set chilled water outlet temperature by the predetermined amount to increase a heat source machine load. In the case where the load change rate is negative, that is, where the chilled water outlet temperature is on a falling trend, the set temperature changing unit 23 increases the set chilled water outlet temperature by the predetermined amount to decrease the heat source machine load.

According to the heat source machine controlling apparatus 10a configured as described above, various measurement values such as the refrigerant condensation pressure Pc are collected by the information acquiring unit 21, and the load change rate is computed by the computing unit 22. The set temperature changing unit 23 determines whether or not the load change rate computed by the computing unit 22 exceeds the predetermined threshold value. In the case where the load change rate exceeds the threshold value, the set temperature changing unit 23 increases or decreases the set chilled water outlet temperature by the predetermined amount so as to suppress a fluctuation in the chilled water outlet temperature. With such use of the load change rate, a fluctuation in the chilled water outlet temperature can be promptly sensed, and an overshoot can be prevented.

Figure 4:
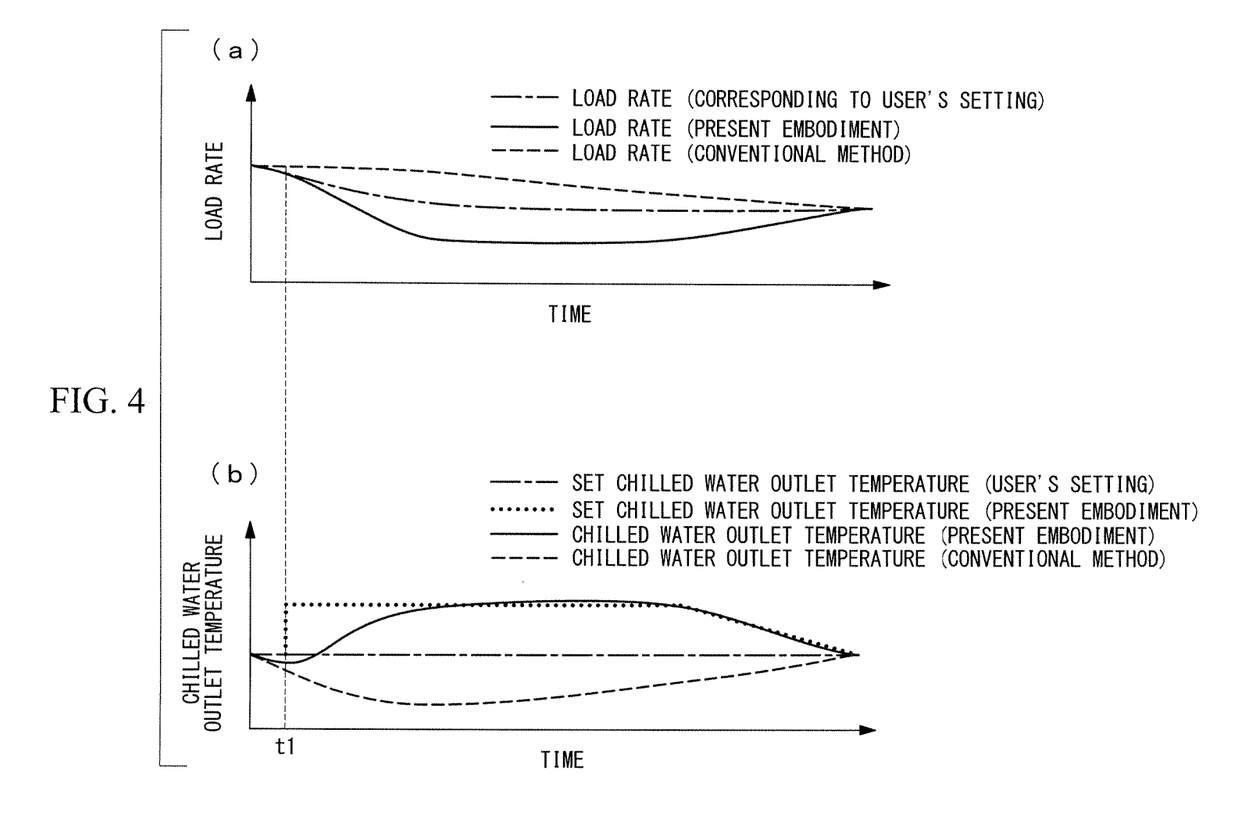
FIG. 4 are diagrams illustrating effects of the heat source machine and a control method therefor according to the first embodiment of the present invention.

FIG. 4 are diagrams illustrating effects of the heat source machine 11a and the control method therefor according to the present embodiment. In FIG. 4(a), the horizontal axis represents the time, the vertical axis represents the load rate, the one-dot chain line represents the load rate corresponding to the set outlet temperature, the broken line represents the load rate according to a conventional control method, and the thick solid line represents the load rate according to the control method of the present embodiment.

In FIG. 4(b), the horizontal axis represents the time, the vertical axis represents the chilled water outlet temperature, the one-dot chain line represents the set chilled water outlet temperature set by a user, in other words, the initial value (for example, 0° C.) of the set chilled water outlet temperature, the dotted line represents the set chilled water outlet temperature according to the present embodiment, the thick solid line represents the chilled water outlet temperature according to the present embodiment, and the broken line represents the chilled water outlet temperature according to the conventional control method.

As illustrated in FIG. 4, in the conventional control method, if the load rate decreases due to a certain factor such as a decrease in the chilled water flow rate, this change cannot be promptly followed, and an overshoot occurs in the chilled water outlet temperature (see the broken line in FIG. 4(b)). In comparison, in the control method according to the present embodiment, a change in the load rate is monitored on the basis of the load change rate. In the case where the load change rate exceeds the threshold value, the set chilled water outlet temperature is changed (see the dotted line at a time t1 in FIG. 4(b)). If the set chilled water outlet temperature is changed, such control that makes the chilled water outlet temperature coincident with the set chilled water outlet temperature after the change is performed. Consequently, the load rate decreases (see the thick solid line in FIG. 4(a)), and the chilled water outlet temperature gradually approaches the set chilled water outlet temperature (see the thick solid line in FIG. 4(b)).

In this way, an overshoot can be suppressed compared with the conventional control method. Particularly in the case where the chilled water outlet temperature is set to around 0° C., in the conventional control method in which an overshoot occurs, the heat medium may freeze, and chilled water cannot be used as the heat medium. In comparison, in the heat source machine and the control method therefor according to the present embodiment, because an overshoot is suppressed, the chilled water outlet temperature can be suppressed from becoming 0° C. or lower. Consequently, chilled water can be used as the heat medium, and the heat exchange efficiency in the evaporator 36 can be enhanced.

In the present embodiment, in the case where the load change rate exceeds the threshold value, the set chilled water outlet temperature is changed. Alternatively, for example, an amount of change (an evaluation value on a fluctuation) in every certain period may be calculated for a parameter that influences the chilled water outlet temperature, such as the chilled water inlet temperature Tin, the chilled water flow rate F1, the cooling water inlet temperature Tcin, and the cooling water flow rate F2. In the case where the amount of change exceeds a predetermined threshold value, the set chilled water outlet temperature may be changed. In this case, if the amount of fluctuation is calculated using a moving average value as described above, influences of noise can be reduced. Note that the change rate may be used instead of the amount of fluctuation. In short, it is sufficient to compute such an evaluation value that reflects a fluctuation in the above-mentioned parameter, and the evaluation function therefor is not particularly limited.

Here, in the case where various parameters such as the chilled water inlet temperature fluctuate, the load rate fluctuates due to this fluctuation. In other words, all these parameters influence the load rate. That is, because a fluctuation in these parameters appears as a fluctuation in the load rate, if the load change rate is monitored, conditions of the heat source machine can be efficiently understood.

Moreover, although the case of cooling the chilled water is described in the present embodiment, also in the case of heating the heat medium (for example, chilled water or warm water), an overshoot in the outlet temperature can be suppressed by performing similar control.

Second Embodiment

Next, a heat source machine and a control method therefor according to the second embodiment of the present invention are described. The heat source machine according to the present embodiment is different in a function of the heat source machine controlling apparatus. Hereinafter, points different from the first embodiment are mainly described, and description of points common thereto is omitted.

Figure 5:
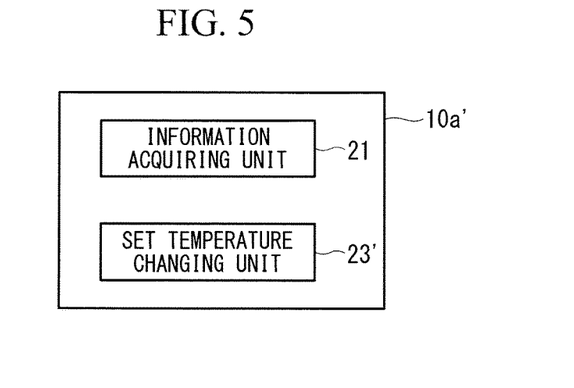
FIG. 5 is a diagram illustrating a functional block example of a heat source machine controlling apparatus according to a second embodiment of the present invention.

FIG. 5 is a functional block diagram of a heat source machine controlling apparatus 10*a*' according to the present embodiment. As illustrated in FIG. 5, the heat source machine controlling apparatus 10*a*' includes the information acquiring unit 21 and a set temperature changing unit 23'.

As described above, the information acquiring unit 21 acquires the refrigerant condensation pressure Pc, the refrigerant temperature Ts, the cooling water flow rate F2, the cooling water outlet temperature Tcout, the cooling water inlet temperature Tcin, the chilled water flow rate F1, the chilled water outlet temperature Tout, the chilled water inlet temperature Tin, and the like.

The set temperature changing unit 23' determines whether or not the refrigerant condensation pressure Pc of the various measurement values acquired by the information acquiring unit 21 exceeds a predetermined threshold value. In the case where the refrigerant condensation pressure Pc exceeds the predetermined threshold value, the set temperature changing unit 23' increases the set chilled water outlet temperature by a predetermined amount. The amount of this increase may be set as appropriate depending on a design.

Figure 6:
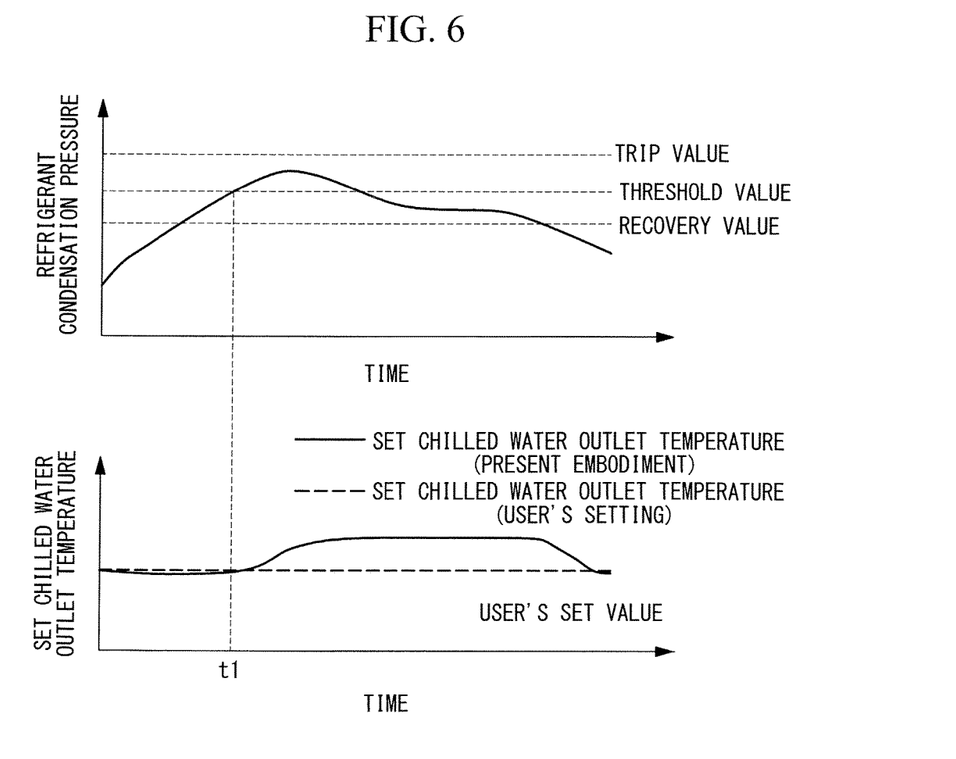
FIG. 6 is a diagram for describing a control method for a heat source machine according to the second embodiment of the present invention.

According to the heat source machine configured as described above, as illustrated in FIG. 6, in the case where the refrigerant condensation pressure Pc of the condenser exceeds the predetermined threshold value (see a time t1), the set chilled water outlet temperature is changed to be higher by the predetermined amount. Because the set chilled water outlet temperature is set to be relatively high, the condensation pressure gradually decreases. Consequently, a forcible stop of the heat source machine can be avoided even under the conditions that the heat source machine load is high and that the outside temperature is high. Moreover, in the case where the refrigerant condensation pressure becomes lower than a predetermined recovery value, the set chilled water outlet temperature may be returned to its initial value.

Moreover, although the refrigerant condensation pressure is used in the present embodiment, the refrigerant condensation temperature may be used instead. In this case, in the case where the refrigerant condensation temperature exceeds a predetermined threshold value, the set chilled water outlet temperature may be chanted to a value higher by a predetermined amount.

The present invention is not limited to only the above-mentioned embodiments, and can be variously modified and carried out within the range not departing from the scope of the invention by, for example, partially or entirely combining the above-mentioned embodiments.

REFERENCE SIGNS LIST

1 heat source system
3 external load
10*a*, 10*a*' heat source machine controlling apparatus
11*a*, 11*b*, 11*c* heat source machine
21 information acquiring unit
22 computing unit
23, 23' set temperature changing unit
31 compressor
32 condenser
36 evaporator

The invention claimed is:

1. A heat source machine including a heat pump cycle in which a compressor, a first heat exchanger, and a second heat exchanger are arranged, the heat source machine performing, in the second heat exchanger, heat exchange between a heat medium supplied from an external load and a refrigerant to thereby cool or heat the heat medium to a predetermined set outlet temperature and supply the cooled or heated heat medium to the external load, the heat source machine comprising:
   a computing unit configured to calculate an evaluation value on a fluctuation for at least any one parameter of an inlet temperature of the heat medium, a flow rate of the heat medium, an inlet temperature of a heat source supplied to the first heat exchanger, a flow rate of the heat source, and a heat source machine load rate, using an arithmetic expression held in advance; and
   a set temperature changing unit configured to change the set outlet temperature of the heat medium to a value lower by a predetermined amount or to a value higher by a predetermined amount so as to suppress a change in an outlet temperature of the heat medium, in a case where the evaluation value calculated by the computing unit exceeds a predetermined threshold value.

2. The heat source machine according to claim 1, wherein the computing unit calculates the evaluation value using a moving average.

3. The heat source machine according to claim 1, wherein an initial value of the set outlet temperature of the heat medium is set to around 0° C.

4. A control method for a heat source machine including a heat pump cycle in which a compressor, a first heat exchanger, and a second heat exchanger are arranged, the heat source machine performing, in the second heat exchanger, heat exchange between a heat medium supplied from an external load and a refrigerant to thereby cool or heat the heat medium to a predetermined set outlet temperature and supply the cooled or heated heat medium to the external load, the control method comprising:
   a computing step of calculating an evaluation value on a fluctuation for at least any one parameter of an inlet temperature of the heat medium, a flow rate of the heat medium, an inlet temperature of a heat source supplied to the first heat exchanger, a flow rate of the heat source, and a heat source machine load rate, using an arithmetic expression held in advance; and a set temperature changing step of changing the set outlet temperature of the heat medium to a value lower by a predetermined amount or to a value higher by a predetermined amount so as to suppress a change in an outlet temperature of the heat medium, in a case where the evaluation value calculated in the computing step exceeds a predetermined threshold value.

* * * * *